(12) United States Patent
Brost et al.

(10) Patent No.: US 8,535,851 B1
(45) Date of Patent: Sep. 17, 2013

(54) METAL-AIR BATTERY AND GAS IMPERMEABLE ANODIC CONDUCTIVE MATRIX

(75) Inventors: Ronald D. Brost, Whitefish, MT (US); Kristine M. Brost, Whitefish, MT (US); Matthew J. Cottrell, Hermosa Beach, CA (US); Howard F. Wilkins, Kalispell, MT (US)

(73) Assignee: ZAF Energy Systems, Incorporated, Columbia Falls, MT (US)

( * ) Notice: Subject to any disclaimer, the term of this patent is extended or adjusted under 35 U.S.C. 154(b) by 0 days.

(21) Appl. No.: 13/526,842

(22) Filed: Jun. 19, 2012

(51) Int. Cl.
*H01M 8/22* (2006.01)
*H01M 4/13* (2010.01)
*H01M 4/60* (2006.01)
*H01M 4/62* (2006.01)

(52) U.S. Cl.
USPC ............ 429/523; 429/403; 429/216; 429/217

(58) Field of Classification Search
USPC ................. 429/126, 122, 137, 403, 404, 216, 429/217
See application file for complete search history.

(56) References Cited

U.S. PATENT DOCUMENTS

| | | | | |
|---|---|---|---|---|
| 5,318,861 | A * | 6/1994 | Harats et al. | 429/404 |
| 5,366,829 | A * | 11/1994 | Saidi | 429/212 |
| 5,434,020 | A | 7/1995 | Cooper | |
| 5,434,021 | A | 7/1995 | Fauteux et al. | |
| 5,532,074 | A | 7/1996 | Golben | |
| 5,554,452 | A | 9/1996 | Delmolino et al. | |
| 5,569,551 | A * | 10/1996 | Pedicini et al. | 429/406 |
| 5,648,187 | A * | 7/1997 | Skotheim | 429/213 |
| 6,232,007 | B1 * | 5/2001 | Payne et al. | 429/403 |
| 6,770,399 | B2 * | 8/2004 | Umeno et al. | 429/231.8 |
| 6,887,615 | B1 * | 5/2005 | Sherman et al. | 429/61 |
| 7,335,440 | B2 * | 2/2008 | Aamodt et al. | 429/94 |
| 7,399,392 | B2 | 7/2008 | Woods et al. | |
| 7,598,000 | B1 | 10/2009 | Chan et al. | |
| 7,670,724 | B1 | 3/2010 | Chan et al. | |
| 8,013,470 | B2 | 9/2011 | Votoupal et al. | |
| 8,048,558 | B2 | 11/2011 | Phillips et al. | |
| 8,182,943 | B2 * | 5/2012 | Visco et al. | 429/231.95 |
| 2002/0102465 | A1 * | 8/2002 | Chen et al. | 429/303 |
| 2004/0253510 | A1 | 12/2004 | Jonghe et al. | |
| 2006/0078790 | A1 * | 4/2006 | Nimon et al. | 429/137 |
| 2010/0323249 | A1 | 12/2010 | Fujiwara et al. | |
| 2011/0008660 | A1 | 1/2011 | Marple et al. | |
| 2011/0027666 | A1 | 2/2011 | Burchardt et al. | |
| 2011/0143173 | A1 * | 6/2011 | Drews et al. | 429/50 |
| 2011/0165462 | A1 * | 7/2011 | Zhamu et al. | 429/223 |
| 2011/0236772 | A1 * | 9/2011 | Burchardt et al. | 429/403 |

FOREIGN PATENT DOCUMENTS

WO     2011124850  A1     10/2011

OTHER PUBLICATIONS

Handbook of Batteries (3rd Ed.) Ed. By Linden and Reddy, McGraw-Hill 2002, Chapter 14 Section 4.2 Safety and Handling of Lithium Batteries, p. 14.18).*

* cited by examiner

*Primary Examiner* — Carlos Barcena
*Assistant Examiner* — James H Ferguson
(74) *Attorney, Agent, or Firm* — Brooks Kushman P.C.

(57) ABSTRACT

A metal-air battery includes a canister and a spiral wound electrode assembly disposed within the canister. The electrode assembly includes an ion permeable and substantially gas impermeable anode, a catalytic cathode, and a dielectric separator disposed between the anode and cathode.

12 Claims, 4 Drawing Sheets

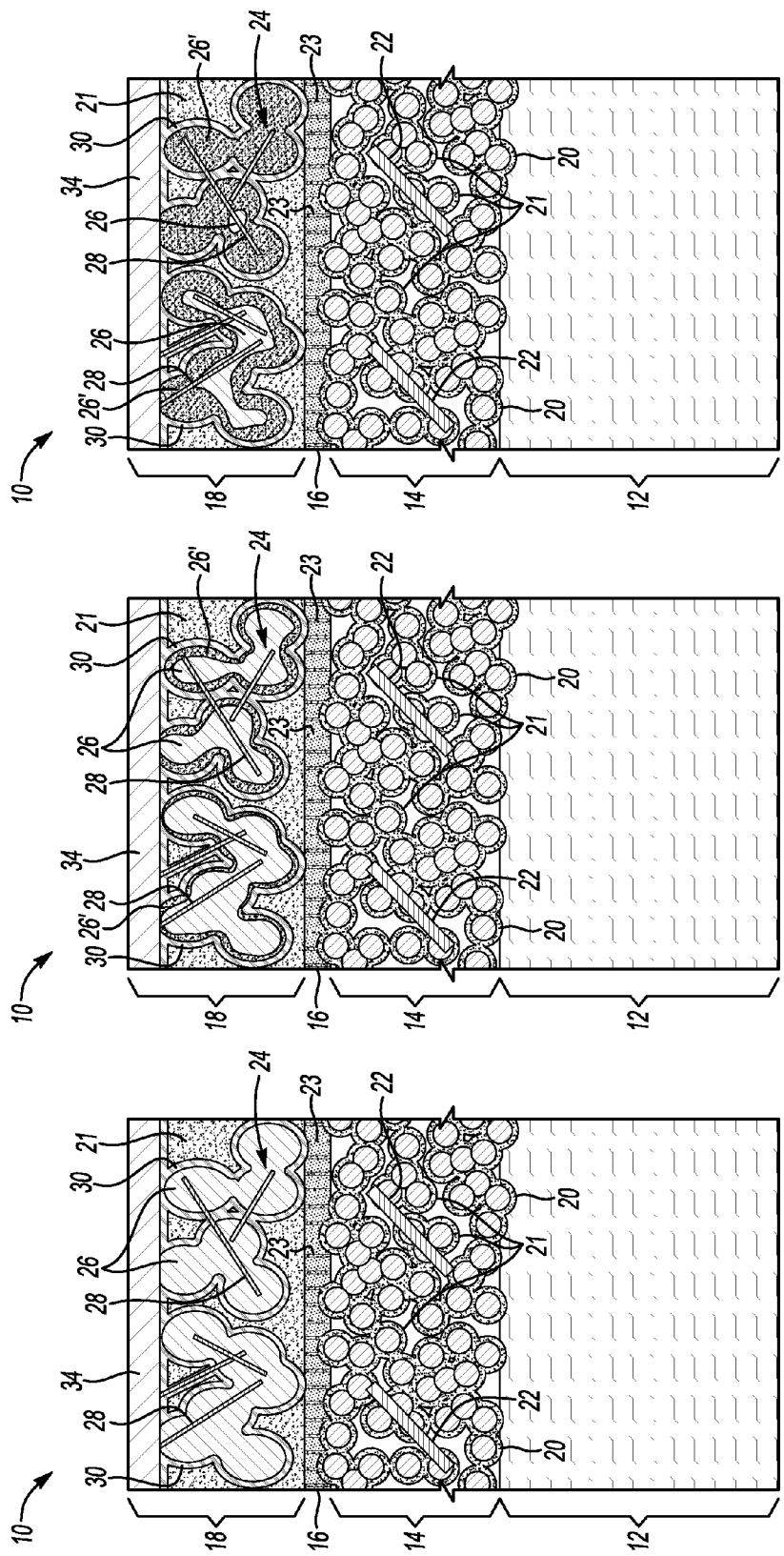

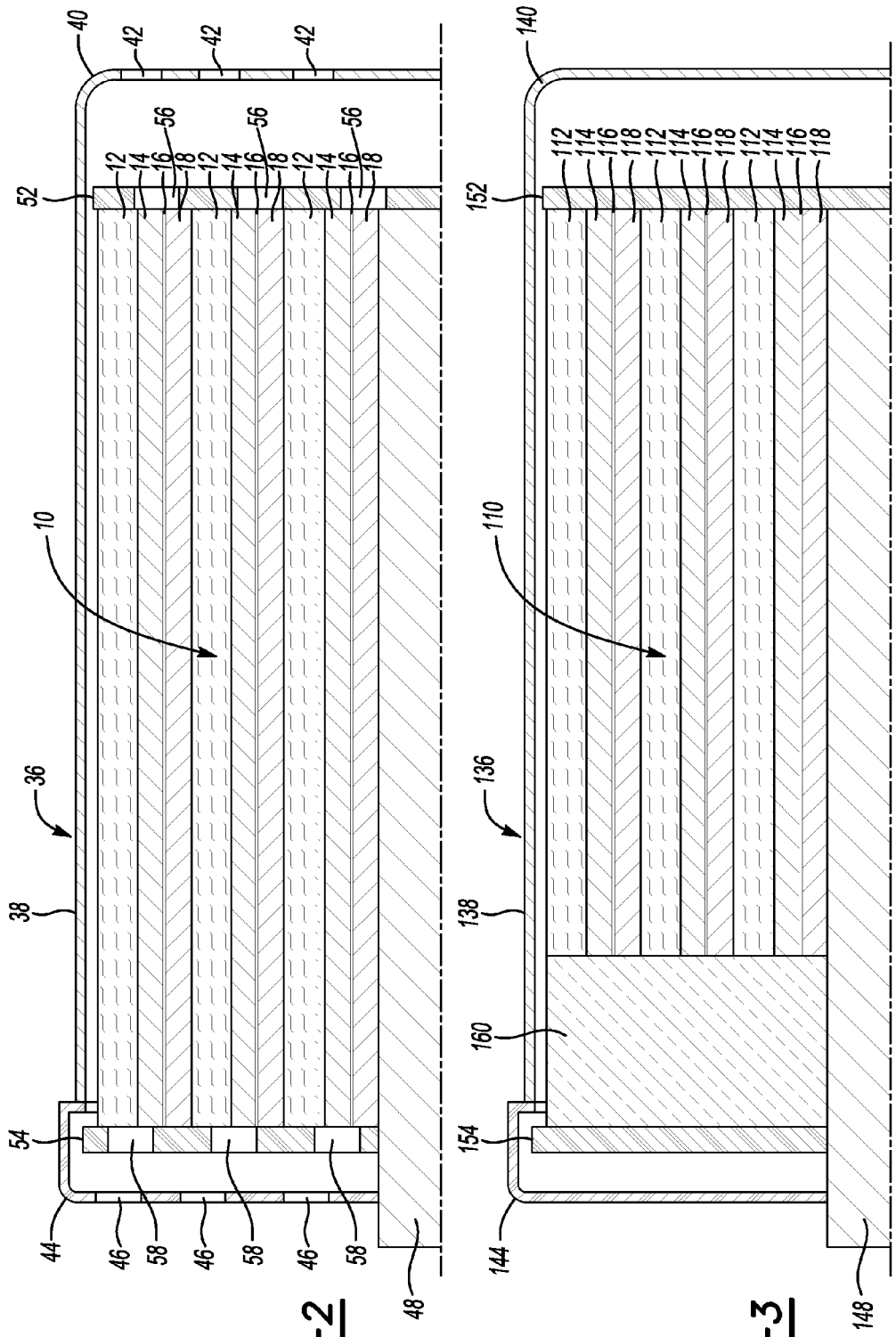

METAL-AIR BATTERY AND GAS IMPERMEABLE ANODIC CONDUCTIVE MATRIX

TECHNICAL FIELD

This disclosure relates to metal-air batteries and electrodes therein.

BACKGROUND

Metal-air batteries are electro-chemical reactors that produce electric current by oxidizing metal with oxygen. These reactors can have high energy densities and be relatively inexpensive to produce. Sizes can range from the small to power hearing aids or cameras to the large to power vehicles.

A mass of metal can form a porous anode that is saturated with an electrolyte. During discharge, oxygen reacts at a cathode to form hydroxyl ions that migrate into the metal/electrolyte paste to form a metal hydroxide, releasing electrons to travel to the cathode. The metal hydroxide decays into metal oxide and the resulting water returns to the electrolyte. The water and hydroxyls from the anode are recycled at the cathode, so the water is not consumed. The reverse process can also occur. During charge, electrons react with the metal oxide to reform the metal, releasing hydroxyl ions that migrate to the cathode. The hydroxyl ions are then oxidized to oxygen gas and water.

SUMMARY

A metal-air battery includes a canister and a spiral wound electrode assembly disposed within the canister. The electrode assembly includes an ion permeable and substantially gas impermeable anode, a catalytic cathode, a dielectric separator disposed between the anode and cathode, and a gas diffusion layer adjacent to the cathode.

A metal anode includes a metal current collector and a conductive matrix in electrical contact with the current collector. The conductive matrix includes metal particles in electrical contact with each other, and a gas impermeable and selectively ionically conductive integument surrounding at least a portion of each of the metal particles such that exposure of the metal particles to oxygen is reduced and relative movement of the metal particles and byproducts thereof is constrained.

An electrode assembly includes an anode, a catalytic cathode, a dielectric separator disposed between the anode and cathode, and a gas diffusion layer adjacent to the cathode. The anode includes a metal current collector and a conductive matrix in electrical contact with the current collector. The conductive matrix includes metal particles in electrical contact with each other and a gas impermeable and ionically conductive skin surrounding at least a portion of each of the metal particles such that exposure of the metal particles to oxygen is reduced and relative movement of the metal particles and byproducts thereof is constrained.

BRIEF DESCRIPTION OF THE DRAWINGS

FIGS. 1A, 1B and 1C are side views, in cross-section slices, of an electrode assembly at three different moments in time during a discharge cycle.

FIGS. 2 and 3 are side views, in cross-section, of portions of metal-air batteries.

DETAILED DESCRIPTION

Figure 4:
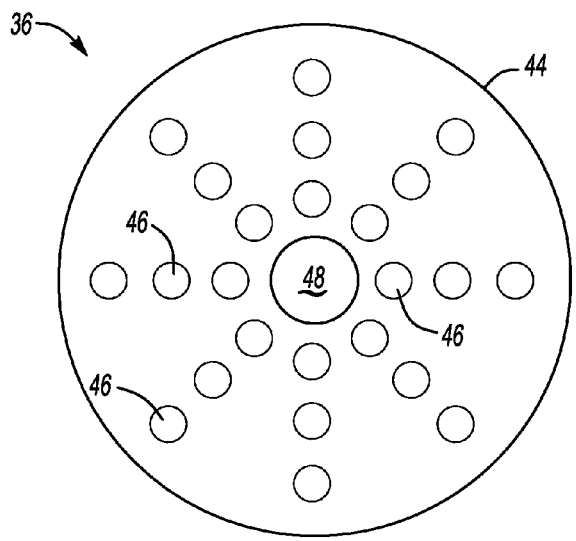
FIG. 4 is an end view of the metal-air battery of FIG. 2.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Anodes of aqueous alkaline metal-air batteries can corrode when exposed to oxygen. This corrosion can affect anode life and in the presence of water, can result in the release of hydrogen. Moreover, mass production of flat plate metal-air batteries is often expensive due to handling complexity, extensive sealing requirements, and low surface-to-volume ratios. Spiral winding metal-air battery electrode assemblies can reduce manufacturing costs and improve the surface-to-volume ratio between the electrode interface and the electrode surface area. This improvement in surface-to-volume ratio, however, can promote exposure of the anode to oxygen and hence exacerbate corrosion of the anode. Certain electrode assemblies disclosed herein include a substantially oxygen impermeable anode. As such, little to no oxygen can react with the anode active material.

Referring to FIG. 1A, an electrode assembly 10 includes a gas diffusion layer (GDL) 12, a cathode 14 in contact with the GDL 12, a separator 16 in contact with the cathode 14, and an anode 18 in contact with the separator 16. In other examples, these elements need not contact each other. Additional layers or a space, for example, can separate the GDL 12 and cathode 14, etc. The GDL 12 acts as a manifold to direct oxygen to the cathode 14. Its thickness can range from 300 to 2000 microns. The cathode 14, in this example, includes a mass of electrically connected particles 20 having a coating of electrolyte 21 over their surface that allows ion transport to the adjacent separator 16 and anode 18 and allows gas transport between the particles 20. The cathode 14 also includes an embedded expanded metal current collector 22. Hence, the cathode 14 is catalytic and porous to allow oxygen from the GDL 12 to interact with the particles 20. Its thickness can range from 100 to 300 microns. The separator 16 is porous to allow passage of electrolyte and is dielectric to insulate the cathode 14 from the anode 18. In one example, the separator 16 is a polymer with a number of small vias 23. Its thickness can be less than 50 microns. Other assembly arrangements are, of course, also possible.

The anode 18 includes a conductive matrix 24. The conductive matrix 24 includes, in this example, connected (fused, sintered, compressed, etc.) active material particles 26, such as zinc particles, aluminum particles, lithium particles, etc., conductive structures 28, such as conductive fibers, conductive nanotubes, a graphite powder, a metal powder, a conductive polymer, metal whiskers, compressed metal fibers, a metal felt, a carbon felt, etc., in contact with and/or embedded in the active material 26, and a gas impermeable, ion permeable integument 30, such as an ion permeable polymer (e.g., modified polystyrenes, perfluorosulfonic acid, etc.) or metal oxide, on the active material 26 (and any products of the oxidation of the active material 26 discussed in greater detail below) that constrains the relative movement of the particles 26 and any byproducts thereof. The conductive matrix 24, in this example, is bathed in the electrolyte 21. The anode 18 also includes a current collector 34, such as a metal foil, expanded metal, etc., in contact with the active material 26.

The use of active material particles 26, instead of a sheet for example, provides increased surface area for a given mass of active material. This yields a higher current density and lower kinetic resistance. Additionally, a breach of the integument 30 would only expose certain of the particles 26 to oxygen: the particles 26 contained within the localized mass associated with the breach. Other integument surrounded masses of the anode 18 would be unaffected.

Referring to FIGS. 1B and 1C, an electrical load (not shown) can be placed across terminals (not shown) electrically connected to the current collectors 22, 34 during discharge. Air from the GDL 12 flows through the cathode 14 as well as possibly the separator 16 and anode 18. Oxygen from the air reacts with water on the catalytic particles 20 to form hydroxyl ions that then migrate through the separator 16 to the integument 30 via the electrolyte 21. The ions then diffuse through the integument 30 and react with the active material 26 to release electrons that travel to the current collector 34 via the active material 26 and/or conductive structures 28, and also form an intermediate metal hydroxide (not shown), which then converts to a metal oxide 26', thereby releasing water.

Oxidation of the active material 26 can cause metal oxide 26' to form in the outermost regions of each of the active material particles 26 first, then forming inward as discharge time continues. Because the metal oxide 26' can be non-conductive and hence isolate electrons from a conductive path to the current collector 34, the conductive structures 28 can provide additional conductive paths for electron travel through the metal oxide 26'.

During charge, an electrical source (not shown) can be placed across the terminals (not shown) electrically connected to the current collectors 22, 34. Electrons from the electrical source travel through the current collector 34 to the metal oxide 26' in contact therewith. Alternatively, electron travel can take place through the current collector 34 to the active material 26 and/or the conductive structures 28. The electrons reduce the metal oxide 26' to produce (or charge) the active material 26, which in the presence of water releases hydroxyl ions. These ions migrate through the electrolyte 21 (in the anode 18 and separator 16) to the cathode 14, whereupon the hydroxide ions are oxidized to produce oxygen gas (not shown) and water in the presence of a suitable catalyst. The oxidation of hydroxide releases electrons that are electrically conducted to the expanded metal current collector 22 and then to the anode current collector 34 via the current source. This completes the electrical and electrochemical circuit.

If the metal oxide 26' is sufficiently conductive itself, or if it is sufficiently blended with a dopant or a conductive additive such as sub-micron carbon particles, the conductive structures 28 can be omitted. Alternatively, the porous separator 16 can be replaced with an ionically conductive membrane to reduce the intrusion of air into the anode 18. A conductive variant of the GDL 12 and catalyst 20, in other examples, can be combined to form a catalyst-coated GDL (not shown) that allows passage of air and also provides a current collection function and ionic contact.

The coated conductive matrix 24 can be produced in any of several ways including (a) sintering of the metal particles 26 with the conductive structures 28 and the foil current collector 34 to achieve a matrix of appropriate porosity attached to the current collector 34, followed by a high-temperature dip in a bath of a thermoplastic form of the ion permeable polymeric skin 30 thereby coating the sintered metal particles 26 yet allowing passage of the electrolyte 21 in the remaining pores; b) sintering of the metal particles 26 with the conductive structures 28 and the foil current collector 34 to achieve a matrix of appropriate porosity attached to the current collector 34, followed by a dip in a solvent dispersion of the ion permeable polymeric skin 30 and subsequent evaporation of the solvent, thereby coating the sintered metal particles 26 yet allowing passage of the electrolyte 21 in the remaining pores; c) hot press rolling of the metal particles 26 with the conductive structures 28, the foil current collector 34, and a suitable binding agent such as polyvinylidene difluoride to achieve a matrix of appropriate porosity attached to the current collector 34, followed by a dip in a solvent dispersion of the ion permeable polymeric skin 30 and subsequent evaporation of the solvent, thereby coating the sintered metal particles 26 yet allowing passage of the electrolyte 21 in the remaining pores; d) pre-coating the metal particles 26 and conductive structures 28 with a solvent dispersion of the ion permeable polymeric skin 30 followed by evaporation of the solvent, then roll milling the active mass together with the foil 34 or an expanded metal current collector such that the softer ionomer is pressed aside and at least some of the particles 26 and conductive structures 28 make direct physical contact with each other, yet leaving open pores for the electrolyte 21 and passage of hydroxide ions, or e) pre-coating the metal particles 26 and conductive structures 28 with a solvent dispersion of the ionomer 30 followed by evaporation of the solvent, then roll milling the active mass together with an expanded metal current collector such that the softer ionomer is pressed aside and the particles 26, conductive structures 28 and current collector make electrical contact with each other and any open pores are closed, and that ionic conductivity and water management is exclusively maintained by the ionomer. In addition, these methods can be adapted to start with a mixture of oxidized metal, binders, conductive structures, ionomers, or electrolyte to achieve an electrode that is substantially in the discharged state and is then processed through a formation step to achieve a suitable structure that provides protection of the active mass against intruding gases.

The anode 18 in combination with other electrode components, such as those described by way of example above, can be used in a variety of battery configurations including flat pack, button, bobbin, bipolar, etc. Referring to FIG. 2 for example, a metal-air battery 36 includes a conductive canister 38 having an end portion 40 including a plurality of perforations 42, a non-conductive cap 44 having a plurality of perforations 46 and sealed against an end of the canister 38 opposite the end portion 40, and an anode terminal post 48 disposed along a center axis of the battery 36 and extending from the end portion 40 through the cap 44.

The electrode assembly 10 is spiral-wound (jelly-rolled) around the post 48 such that the current collector 34 (FIG. 1) of the anode 18 contacts the post 48. The electrode assembly 10 is shown to be wound approximately three times. Any suitable number of windings, however, can be used. Additionally, the current collector 22 (FIG. 1) of the cathode 14 is electrically connected with the canister 38 via a metal tab, wires, etc. Non-conductive spacers 52, 54 each including a plurality of perforations 56, 58 respectively are positioned at end portions of the electrode assembly 10 to provide mechanical stability for the jellyroll 10 yet allow air passage through the spacers 52, 54 and then the jellyroll 10. The perforations 42, 46, 56, 58 permit gas to flow through the metal-air battery 36 to promote the electro-chemical reactions described with reference to FIG. 1. As discussed in more detail below, the perforations 42, 46, 56, 58 can also be arranged to promote generally uniform and/or swirling flow of gas into the electrode assembly 10.

The configuration of FIG. 2 can be reversed such that the post 48 is wrapped initially by the cathode 14, thereby providing a positive terminal at the post 48. Alternatively, the canister 38 can be conductive and the post 48 can be isolated from the canister 38 with a crimp-sealed polymer or a glass-to-metal seal. Other configurations are also possible. For example, the post 48 need not be disposed along the center axis of the battery 36, etc.

Referring to FIG. 3, a metal-air battery 136 includes a conductive canister 138 having an end portion 140, a non-conductive cap 144 sealed against an end of the canister 138 opposite the end portion 140, and an anode terminal post 148 disposed along a center axis of the battery 136 and extending from the end portion 140 through the cap 144. The battery 136 also includes an electrode assembly 110 spiral-wound around the post 148 such that the current collector (not shown) of the anode 118 contacts the post 148, and non-conductive spacers 152, 154 positioned at or near end portions of the electrode assembly 110. Unlike the battery 36 of FIG. 2, the battery 136 includes an internal source of oxygen 160, such as metal organic framework compounds or a high pressure vessel with a highly compressed quantity of oxygen, disposed in this example between the electrode assembly 110 and spacer 154. In other examples, the source of oxygen 160 could be disposed in any desired location. It, for example, could be placed between the electrode assembly 110 and spacer 152, etc. The source of oxygen 160, as the name suggests, is the source of oxygen for the electrochemical reactions described with reference to FIG. 1.

Figure 5:
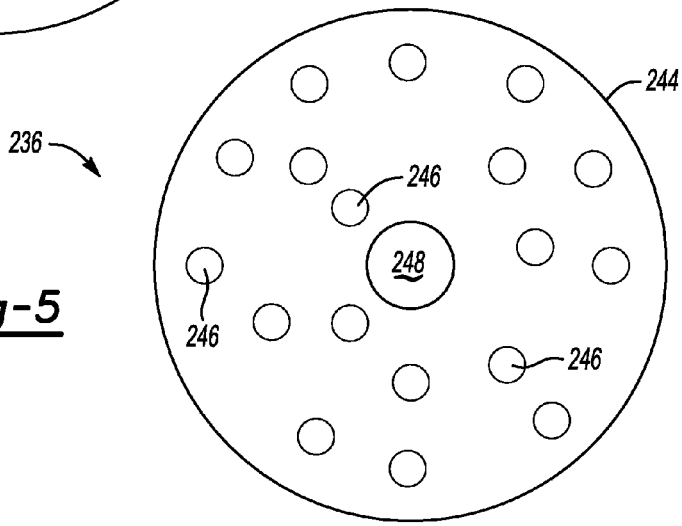
FIGS. 5 and 6 are end views of other metal-air batteries.
Figure 6:
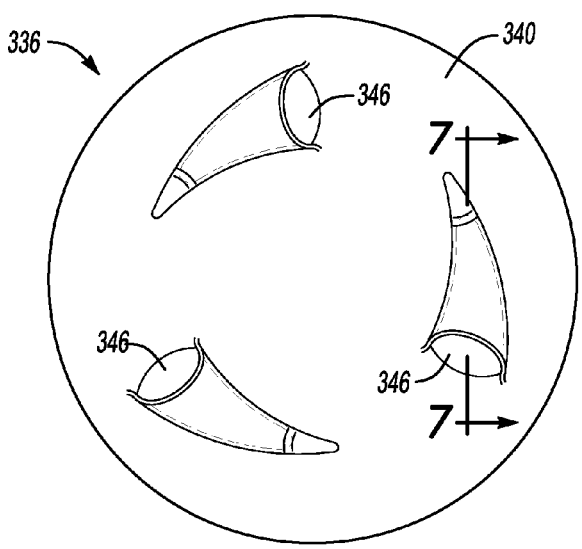
Figure 7:
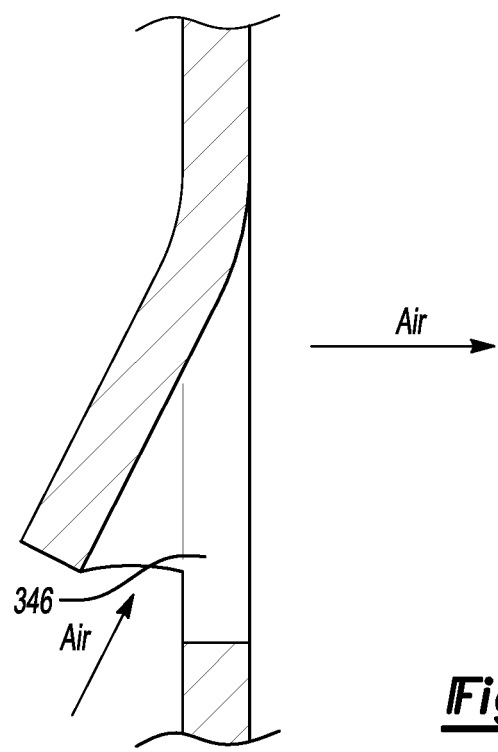
FIG. 7 is a side view, in cross-section, of a portion of the metal-air battery of FIG. 6.

Referring to FIG. 4, the perforations 46 are radially arranged in groups of three about the cap 44. Any suitable perforation arrangement, however, can be used. Referring to FIG. 5 as an example, a metal-air battery 236 includes a non-conductive cap 244 having a plurality of passageways 246 arranged to promote vertical air flow there through. Referring to FIGS. 6 and 7 as another example, a metal-air battery 336 includes an end portion 340 having a plurality of openings or ducts 346 arranged to induce air swirl and mixing as the air enters, for example, under forced convection. Openings or ducts, in other examples, can be positioned on sidewall portions of the cap and/or canister. Testing, simulation, etc. can be used to determine optimum opening arrangement. Gas passageways of other components can be similarly optimized to achieve desired performance.

Figure 8:
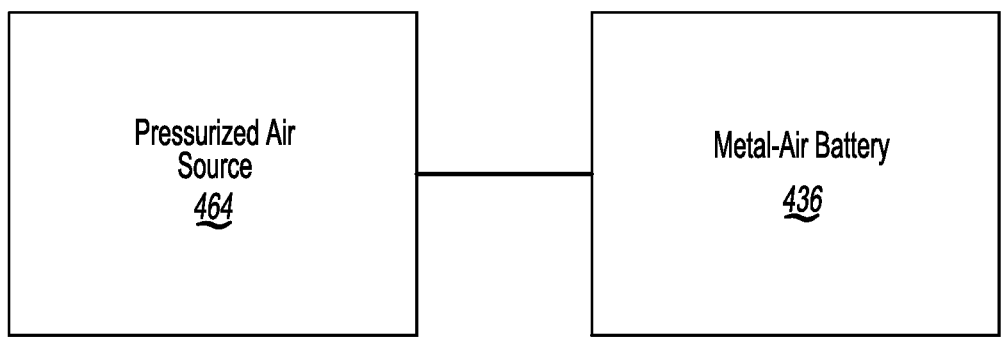
FIG. 8 is a block diagram of a metal-air battery system.

Referring to FIG. 8, a metal-air battery system 462 can include a pressurized gas (or oxygen) source 464 in fluid communication with a metal-air battery 436. The air-source 464 is arranged to force air through the battery 436 at selectable rates to achieve desired performance. The battery 436, in other examples, can be arranged with an air sink (not shown) arranged to pull air through the battery 436 at selectable rates. Other configurations are also possible. While a moderate level of performance can be realized using passively diffused air as a source and no forced airflow, forced air convection can improve current density and lower polarization by raising the oxygen stoichiometry for the reaction at the air cathode catalyst particles during discharge, or by diluting the oxygen formed during the charge process.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A metal-air battery comprising:
   a canister; and
   a spiral wound electrode assembly disposed within the canister and including an anodic bulk matrix, a catalytic cathode, a separator disposed between the anodic bulk matrix and cathode, and a gas diffusion layer adjacent to the cathode, wherein the anodic bulk matrix includes an active material having a surface area defining voids within the anodic bulk matrix and a non-porous coating on the surface area and wherein the non-porous coating is water and hydroxide ion permeable and substantially active metal ion and gas impermeable.

2. The battery of claim 1 further comprising a current collector in contact with the anodic bulk matrix.

3. The battery of claim 1 wherein the anodic bulk matrix further includes a conductive additive.

4. The battery of claim 3 wherein the conductive additive is conductive fibers, conductive nanotubes, a graphite powder, a metal powder, a conductive polymer, metal whiskers, compressed metal fibers, a metal felt, or a carbon felt.

5. The battery of claim 1 wherein the non-porous coating is a polymer or a metal oxide.

6. The battery of claim 1 wherein the active material is a metal.

7. The battery of claim 1 wherein the canister is configured to permit gas to flow therethrough.

8. The battery of claim 7 wherein the canister is configured to promote generally uniform flow of the gas into the electrode assembly.

9. The battery of claim 7 wherein the canister has an end portion having a surface defining a plurality of passageways configured to promote generally uniform flow of the gas into the electrode assembly.

10. The battery of claim 7 wherein the electrode assembly includes an end portion and wherein the canister has an end portion adjacent to the end portion of the electrode assembly including a surface defining a plurality of ducts configured to promote swirling flow of the gas near the end portion of the electrode assembly.

11. The battery of claim 7 wherein the canister is configured to be fluidly connected to a source of pressurized gas.

12. The battery of claim 1 further comprising an oxygen reservoir disposed within the canister.

* * * * *